United States Patent [19]

Lister

[11] 4,324,438

[45] Apr. 13, 1982

[54] DRILLING DECK BUSHING

[75] Inventor: Roy D. Lister, Fort Worth, Tex.

[73] Assignee: Eagle-Picher Industries, Inc., Cincinnati, Ohio

[21] Appl. No.: 206,686

[22] Filed: Nov. 13, 1980

[51] Int. Cl.³ ............................................. F16C 31/02
[52] U.S. Cl. ..................................... 308/3.5; 308/4 R
[58] Field of Search ............... 308/3.5, 4 R, 4 A, 4 C, 308/26, 36.2, 37, 63

[56] References Cited

U.S. PATENT DOCUMENTS

| | | | |
|---|---|---|---|
| 3,812,938 | 5/1974 | Fader et al. | 308/3.5 |
| 3,833,070 | 9/1974 | Anderson | 308/4 R |
| 3,850,483 | 11/1974 | Roberts et al. | 308/3.5 |
| 3,944,300 | 3/1976 | Learmont et al. | 308/4 R |

Primary Examiner—Lenard A. Footland
Attorney, Agent, or Firm—Wood, Herron & Evans

[57] ABSTRACT

A bushing for the deck of drilling rig in which slowly rotating drilling pipe (drill string) move downwardly to form a bore in the earth. The bushing includes an outer shell, an inner shell mounted for rotation within the outer shell and an elastomeric bushing mounted within the inner shell for rotation therewith. The bushing is formed of a plurality of arcuate segments which are snugly fitted against the drilling pipe by a garter spring which allows for limited expansion of the segments with respect to each other to accommodate pipe of differing diameters. The end portions of the segments overlap one another so that as the bushing is expanded, a seal against dust and fluids is maintained.

6 Claims, 6 Drawing Figures

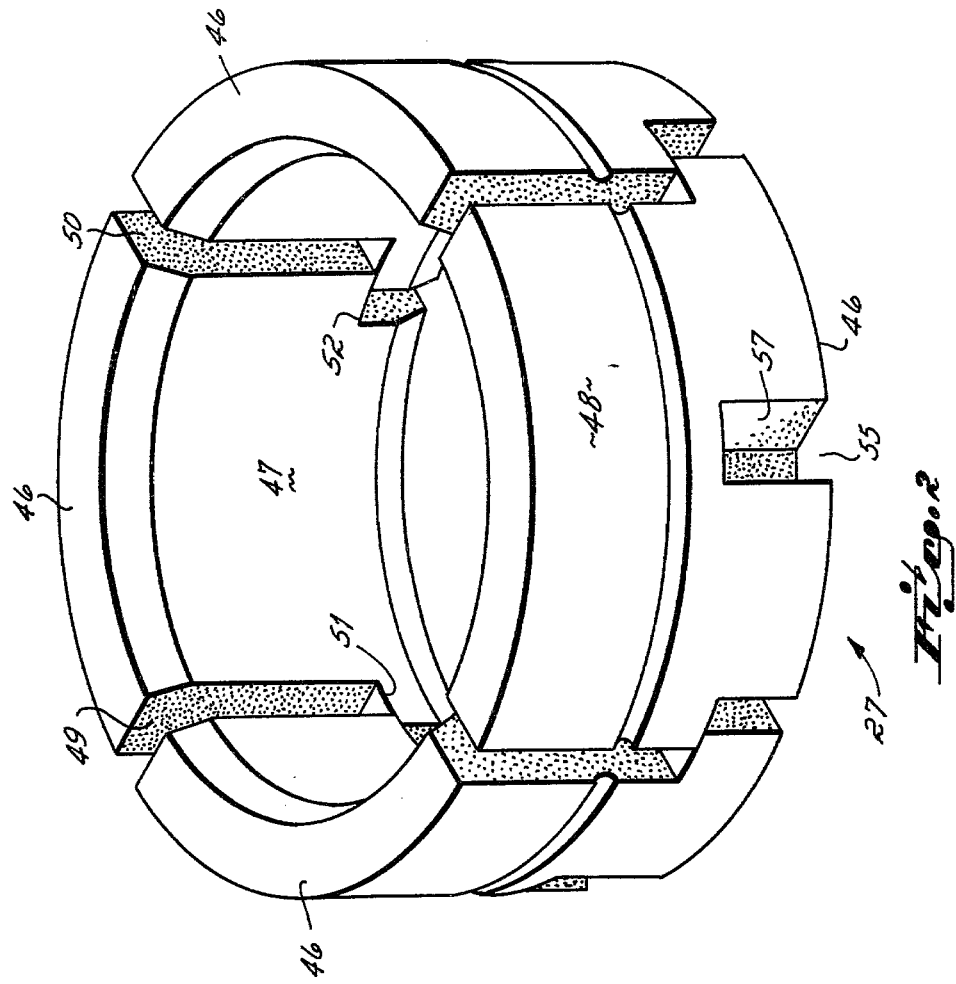
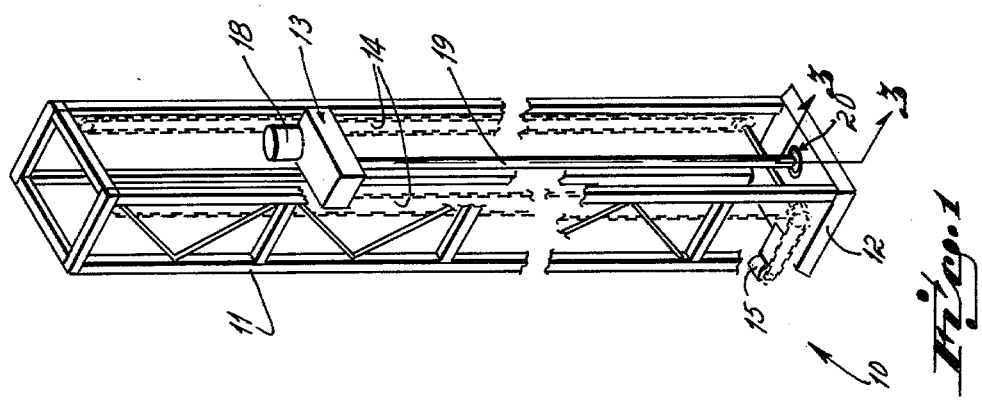

DRILLING DECK BUSHING

This invention relates to a rotary bushing, and more particularly, the invention relates to a bushing through which pipe passes for drilling into the earth as, for example, in a drilling rig used for drilling holes to form air shafts to underground mines.

The drilling rig is mounted on a deck or drilling platform overlying the position where an air shaft will be formed in the earth to a mine below the drilling rig. A long string of pipe passes through a hole in the deck, the pipe being rotated at about 200 rpm as it slowly descends through the earth creating the air shaft bore.

As the pipe rotates and descends, there is lateral movement which tends to cause the pipe to bang against the drilling deck and which causes the pipe to wear, thereby reducing its outside diameter. Dust and fluids are thrown up by the drilling operation and will tend to flow upwardly through any opening in the drilling deck.

There are presently known rotary bearings which are mounted between the deck and pipe and consist of a metallic inner collar which rotates with the pipe and an outer collar fixed to the deck with ball bearings in between. Such rotary bearings will minimize the wear on the pipe (drill string) but they are very expensive.

An objective of the present invention has been to provide a rotary bushing which is less expensive than the known rotary bearings.

It has been another objective of the present invention to provide a rotary bearing which will accommodate different outside diameters of pipe.

It has been another objective of the invention to provide a rotary bushing which forms a seal around the pipe, regardless of whether it has been worn by substantial use, the seal preventing dust and the like from flowing upward onto the drilling deck.

It has been another objective of the present invention to minimize wear on the drill string.

It has been another objective of the invention to provide a rotary bushing which reduces shock on the drill string and the deck as it moves laterally and tries to bang the deck.

The objectives of the present invention are achieved by providing a new rotary bushing having an outer shell, an inner shell which rotates with respect to the outer shell and an elastomeric bushing which is blocked against rotation with respect to the inner shell. The elastomeric bushing is segmented into preferably four arcuate segments so that it can contract against the smaller diameter or worn pipe or can expand to accommodate the larger diameter new pipe. A garter spring or elastomeric band fitted around the outer circumference of the elastomeric bushing draws the segments tightly against the outer surface of the pipe. The segments have at their end portions overlapping elements so that even with expansion of the segments a dust seal is maintained around the pipe.

Several advantages are derived from the rotary bushing as described in addition to its comparatively low cost. First, the expandable and contractable segments with their overlapping elements allow the bushing to expand and contract and thus accommodate the pipe in the drill string as it wears and its diameter changes. In expanding and contracting, while remaining snug around the pipe, a seal is maintained around the pipe preventing dirt and fluids from exiting around the pipe.

Second, the elastomeric nature of the segments and the garter spring which holds the sections against the pipe provide a gripping action causing the bushing to turn with the drill string. Thus, the only wear on the drill string arises out of its downward movement and thus wear on the pipe of the drill string is minimized. This lengthens the usual life of the drill string compared to existing static deck bushings.

Third, the elastomeric nature of the bushing segments provides a cushion for absorbing shock from the drill string as it tends to move laterally. This feature of the invention minimizes premature failure of the pipe in the drill string and even damage to the deck plates themselves due to excessive stresses.

The several objectives and features of the invention will become more readily apparent from the following detailed description taken in conjunction with the accompanying drawings in which:

FIG. 1 is a diagrammatic perspective view of a drilling rig of the present invention;

FIG. 2 is a perspective view of the elastomeric bushing;

Figure 3:
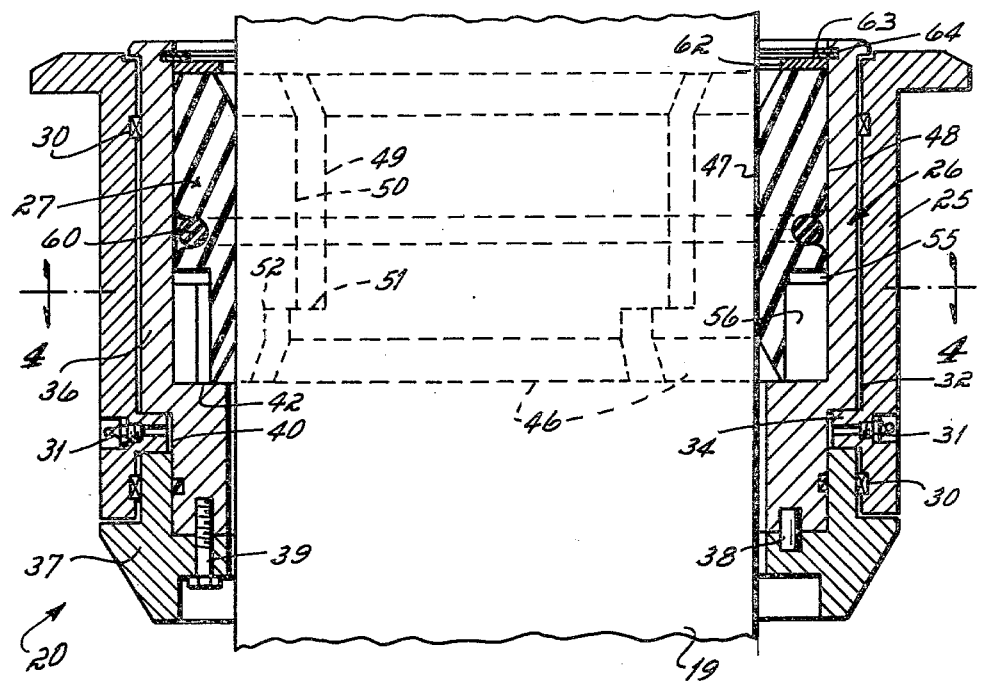
FIG. 3 is a cross-sectional view taken along lines 3—3 of FIG. 1 illustrating the complete bushing assembly with a pipe passing therethrough.

The drilling rig shown at 10 in FIG. 1 consists of tall scaffolding or tower 11 supported on a deck or drilling platform 12. A pipe rotating assembly 13 is mounted for vertical movement on the scaffolding 11, the assembly being connected to cables or chains 14 which are driven by a motor 15 to raise and lower the assembly. The assembly includes a motor 18 which rotates pipe 19 connected to the assembly as the assembly is slowly lowered into the earth below the drilling deck 12. The pipe passes through a bushing 20 secured to the deck 12.

Figure 4:
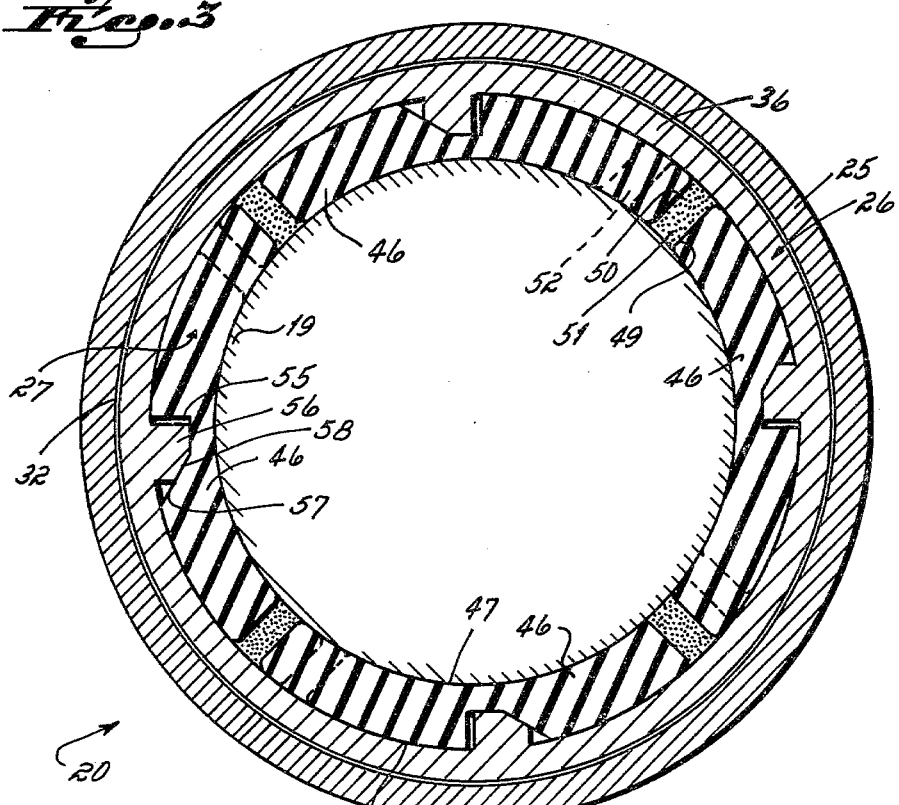
FIG. 4 is a cross-sectional view taken along lines 4—4 of FIG. 3.

The rotary bushing 20 is illustrated in FIGS. 3 and 4. It includes an outer shell 25, an inner shell 26 and an elastomeric bushing 27. The outer shell 25 and the inner shell 26 have upper and lower seals 30 between them. Grease fittings 31 are provided in the outer shell in order to apply a lubricating grease into the space 32 between the outer and inner shells. An annular flange 34 projects inwardly from the outer shell and provides support for the inner shell as well as the elastomeric bushing.

The inner shell is formed by an upper sleeve 36 and a lower collar 37 which is secured to the upper sleeve by one or more pins 38 and bolts 39. The sleeve 36 and collar 37 create between them an external annular recess 40 which receives the annular flange 34 on the outer shell and maintains the axial position of the inner shell with respect to the outer shell.

The sleeve 36 also presents a shoulder 42 which provides axial support for the elastomeric bushing 27. The elastomeric bushing 27 is best illustrated in FIG. 2 and consists of a plurality of segments 46. In the illustrated embodiment, four segments 46 are shown. It should be understood that the number of segments can be varied as long as they collectively can be fitted around pipe and have the capability of expanding and contracting while maintaining the dust seal.

The segments are identically formed. Each has arcuate inner and outer surfaces 47 and 48, respectively, and lateral edge surfaces 49 and 50, respectively. When the lateral surfaces are in abutting relation, the inner surfaces 47 combine to provide a cylinder which grips the pipe and the outer surfaces 48 present a generally cylindrical surface which fits within the sleeve 36 of the inner shell.

The lateral edge 49 of each segment has an upwardly-facing shoulder 51 and the opposed lateral edge surface 50 has a downwardly-facing shoulder 52 which overlaps the upwardly-facing shoulder 51 to provide a dust seal between adjacent segments even though the segments are spread apart as they accommodate a larger diameter pipe.

Figure 6:
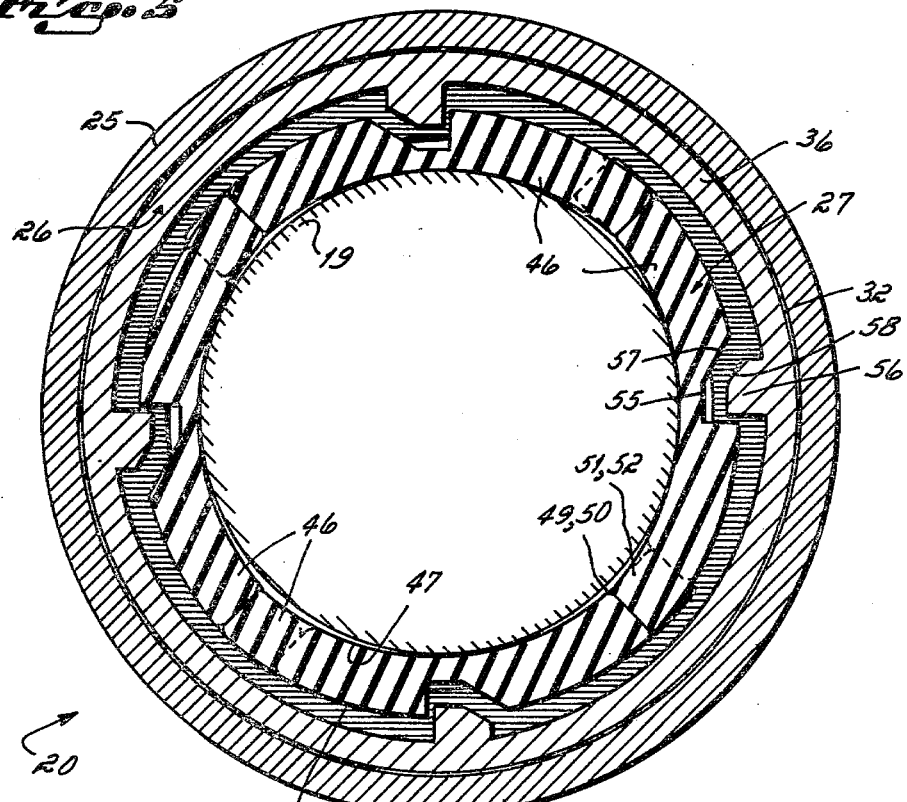
FIG. 6 is a cross-sectional view taken along lines 6—6 of FIG. 5.

Each outer surface 48 has a recess 55 which receives an abutment 56 (FIGS. 4 and 6). The recess 55 has an inclined abutment surface 57 which engages an inclined surface 58 on the abutment 56 and prevents rotation of the elastomeric bushing with respect to the inner shell as the pipe rotates and tends to drag the elastomeric bushing. Thus, the elastomeric bushing drives the inner shell in rotation with respect to the outer shell during the operation of the invention. Further, it will be observed that when the drill string 19 rotates clockwise, it will tend frictionally to drag the elastomeric segments clockwise causing the engaged cam surfaces 57 and 58 to cam the segments inwardly into snug engagement with the pipe.

A garter spring or resilient band 60 surrounds the four segments and draws them radially inwardly snugly against the pipe.

After the segments of the elastomeric bushing are positioned in the inner shell to rest upon the shoulder 42, a washer 62 and a snap ring 63 placed in a groove 64 in the upper end of the inner shell secures the elastomeric bushing against axial movement with respect to the inner shell.

In the operation of the invention, the bushing is assembled as shown generally in FIG. 3 and the pipe 19 passes through it. As shown in FIGS. 3 and 4, the pipe 19 has a large outer diameter. As a consequence, the arcuate elastomeric segments of the bushing are spread apart and may actually have their outer surfaces in contact with the inner surface of the shell 26. Even though spread apart, the overlapping shoulders 51 and 52 provide a complete circular seal around the pipe to prevent dust from flowing up past the pipe onto the deck of the drilling rig. The garter spring or elastomeric band 60 holds the segments snugly against the pipe. Also, the cooperating abutments 56 and 57 maintain the arcuate segments in an equiangular relationship with respect to one another as the pipe rotates, thus avoiding the bunching up of the segments at one side of the pipe.

Figure 5:
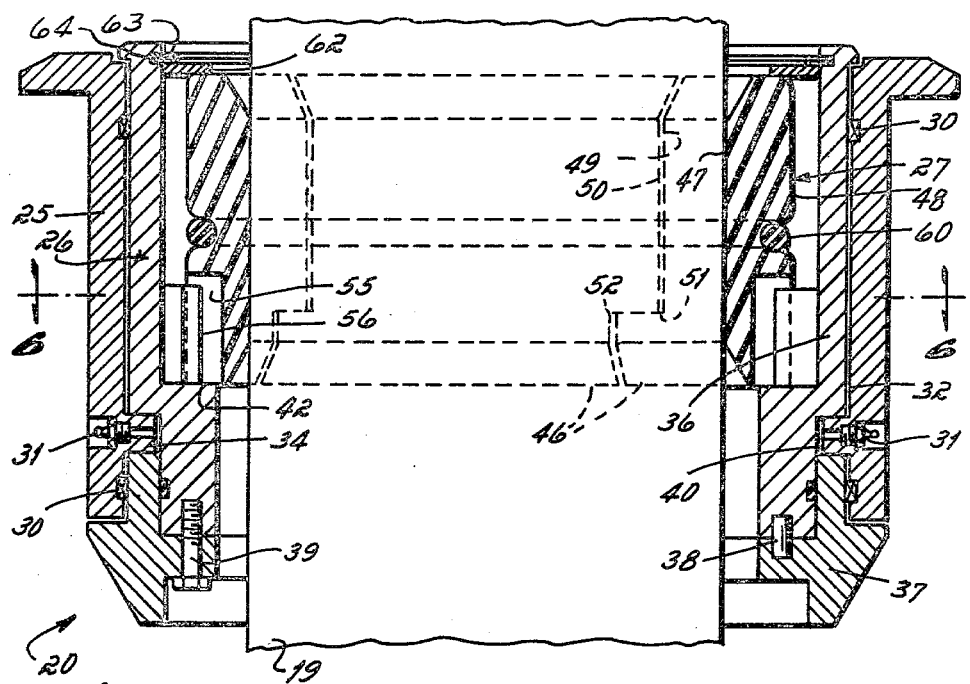
FIG. 5 is a cross-sectional view similar to that of FIG. 3 showing the bushing applied to worn or smaller diameter pipe.

If a worn pipe 19 of smaller diameter passes through the bushing (FIGS. 5 and 6), the garter spring 60 will cause the segments to contract and maintain a snug relationship with the pipe so as to continue to maintain a dust seal through the bushing.

As the pipe 19 rotates, it will carry the elastomeric bushing with it in rotary fashion. The elastomeric bushing will in turn, through the abutments 56 and 57, cause the inner shell 26 to rotate with respect to the outer shell 25. Since the only relative movement between the pipe and the elastomeric bushing is the descending movement of the pipe as it moves into the earth below, the wear on the pipe is minimized. The lateral movement of the pipe with respect to the drilling platform will be substantially entirely absorbed by the elastomeric material, thereby reducing the shock on the pipe as well as the shock on the plates of the drilling platform, thereby minimizing the possibility of damage to either.

Having described my invention, I claim:

1. A bushing for the deck of a drilling rig comprising, an outer shell,
an inner shell mounted for rotation within said outer shell,
an elastomeric bushing mounted within said inner shell,
said bushing being formed of a plurality of arcuate segments which together present a generally cylindrical inner surface for engagement with a circular pipe,
abutment means between said bushing and said inner shell blocking rotation of said bushing with respect to said inner shell.

2. A bushing as in claim 1 further comprising a garter spring surrounding said arcuate segments for urging them snugly against the surface of said circular pipe.

3. A bushing as in claim 1 in which each segment has at one edge an upwardly-facing shoulder and at the other edge a downwardly-facing shoulder,
said shoulders of adjacent segments overlapping to provide a dust seal between segments.

4. A bushing as in claim 1 further comprising,
overlapping portions on adjacent segments, said overlapping portions being circumferentially adjustable to permit said bushing to accommodate itself to pipe of differing diameters.

5. A bushing as in claim 1 wherein said abutment means includes cooperating inclined surfaces on said bushing segments and said inner shell, respectively, tending to cam said segments radially inwardly as said circular pipe rotates.

6. A bushing for the deck of a drilling rig comprising,
an outer shell adapted to be mounted on a drilling rig deck or the like,
an inner shell mounted within said outer shell for rotation with respect to said outer shell,
a plurality of radially inwardly-projecting abutments on said inner shell,
a plurality of elastomeric bushing segments mounted within said inner shell,
each segment being arcuate and, when in edge-to-edge abutting relation, forming a generally cylindrical bushing presenting an inner cylindrical surface adapted to frictionally grip a pipe, and presenting an outer cylindrical surface spaced from the inner surface of said inner shell,
said segments being expandable outwardly to grip pipes of larger diameters,
the outer surface of each segment having a recess to receive said abutment, thereby blocking rotation of said segments with respect to said inner shell.

* * * * *